Oct. 31, 1967

R. E. MORGAN 3,350,572

HIGH FREQUENCY CHOPPER CIRCUIT

Filed April 6, 1964

6 Sheets-Sheet 1

Inventor:
Raymond E. Morgan
by Charles W Helzer
His Attorney

Inventor:
Raymond E. Morgan
by Charles W Helzer
His Attorney

Inventor:
Raymond E. Morgan
by Charles W. Helzer
His Attorney

Inventor:
Raymond E. Morgan
by Charles W. Helzer
His Attorney

Inventor:
Raymond E. Morgan
by Charles W. Helzer
His Attorney

Inventor:
Raymond E. Morgan
by Charles W Helzer
His Attorney

United States Patent Office 3,350,572

Patented Oct. 31, 1967

3,350,572
HIGH FREQUENCY CHOPPER CIRCUIT

Raymond E. Morgan, Schenectady, N.Y., assignor to General Electric Company, a corporation of New York Filed Apr. 6, 1964, Ser. No. 357,381
12 Claims. (Cl. 307—88.5)

ABSTRACT OF THE DISCLOSURE

A high frequency transistor-saturable transformer chopping circuit comprises a power transistor and load connected across a D-C source. A saturable core transformer has a primary winding for initiating turn on and turn off of the transistor, and one secondary winding is connected in the base emitter circuit of the transistor while optionally other secondary windings are provided for control and inhibit purposes. To turn on the power transistor more quickly, a series connected tunnel diode and blocking diode are in parallel with the series connected base-emitter circuit and impedance matching diode, and another circuit applies a reverse bias to the transistor to turn it off quickly. An inverter comprises four power transistors bridge-connected to the load.

The present invention relates to a high frequency chopper circuit for use in inverter and time ratio control power circuits.

More particularly, the invention relates to a high frequency chopper circuit employing high speed power transistors and tunnel diodes to achieve high chopping frequencies.

With the advent of power semiconductor devices for switching electric currents at power levels, such as the silicon control rectifier (SCR) and the power transistor, there has been a continuing effort to employ such devices for switching purposes at higher and higher frequencies. To accomplish this, the present invention employs a tunnel diode in conjunction with a power transistor to achieve high speed switching of the power transistor. As a consequence, circuits employing the arrangement can be operated at higher chopping frequencies than heretofore possible. In addition, the circuit employs a saturable core transformer in conjunction with a power transistor and tunnel diode to provide multiple insulated inputs to control the high speed chopping circuit. By such construction, the multiple inputs are effectively isolated from the high frequency power output.

It is therefore a primary object of the present invention to provide a high speed power chopping circuit arrangement employing high speed power transistors and tunnel diodes.

Another object of the invention is to provide such a high speed power chopping circuit employing a saturable core transformer to provide multiple insulated inputs that are effectively isolated from the high frequency power derived at the output of the circuit.

In practicing the invention, a high frequency power transistor switching circuit is provided which includes a power transistor having a base-emitter circuit and a source of high frequency switching signals operatively coupled across the base-emitter circuit of the power transistor. The high speed switching circuit is completed by means comprised by a tunnel diode connected across the base-emitter circuit of the power transistor in parallel circuit relationship with the high speed switching signal source, to increase the switching speed of the high speed power transistor. In a preferred embodiment of the invention, a saturable core transformer is also provided having at least inductively coupled primary and reset windings wound on a common saturable core member. The primary winding is connected across the emitter-base of the power transistor and a source of reset potential is operatively coupled to the reset winding for resetting the core of the saturable core transformer. Further preferred embodiments of the invention include a blocking diode connected in series circuit relationship with the tunnel diode so as to conduct current in the same direction, and an impedance matching diode connected in series circuit relationship with the emitter-base of the power transistor. The circuit is arranged so that the series connected tunnel diode and blocking diode are connected in parallel with the impedance matching diode and emitter-base of the power transistor. Additionally, a clamping diode is operatively connected in parallel with the emitter-base of the power transistor in a reverse polarity sense with respect to the blocking diode.

Other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein.

Figure 13:
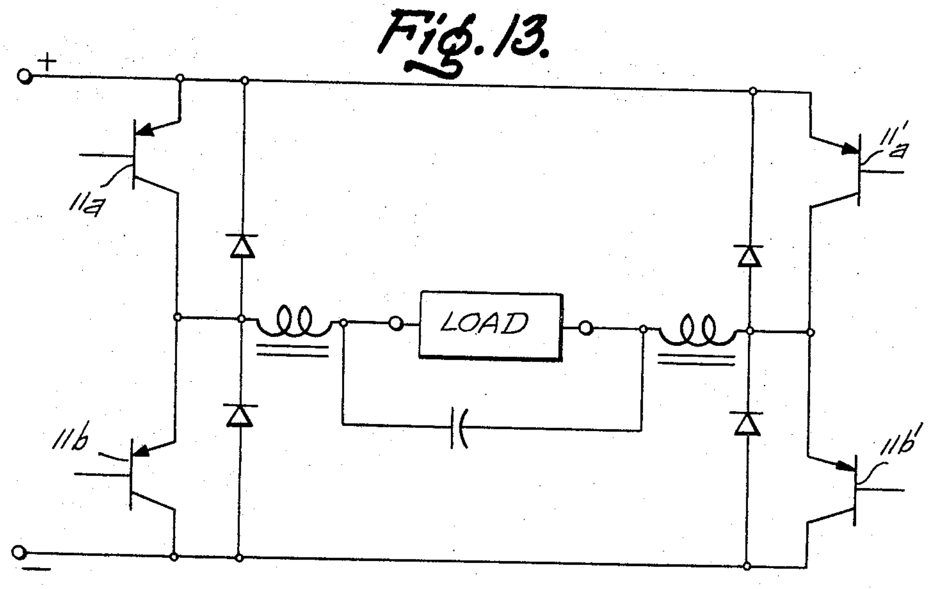
Figure 12:
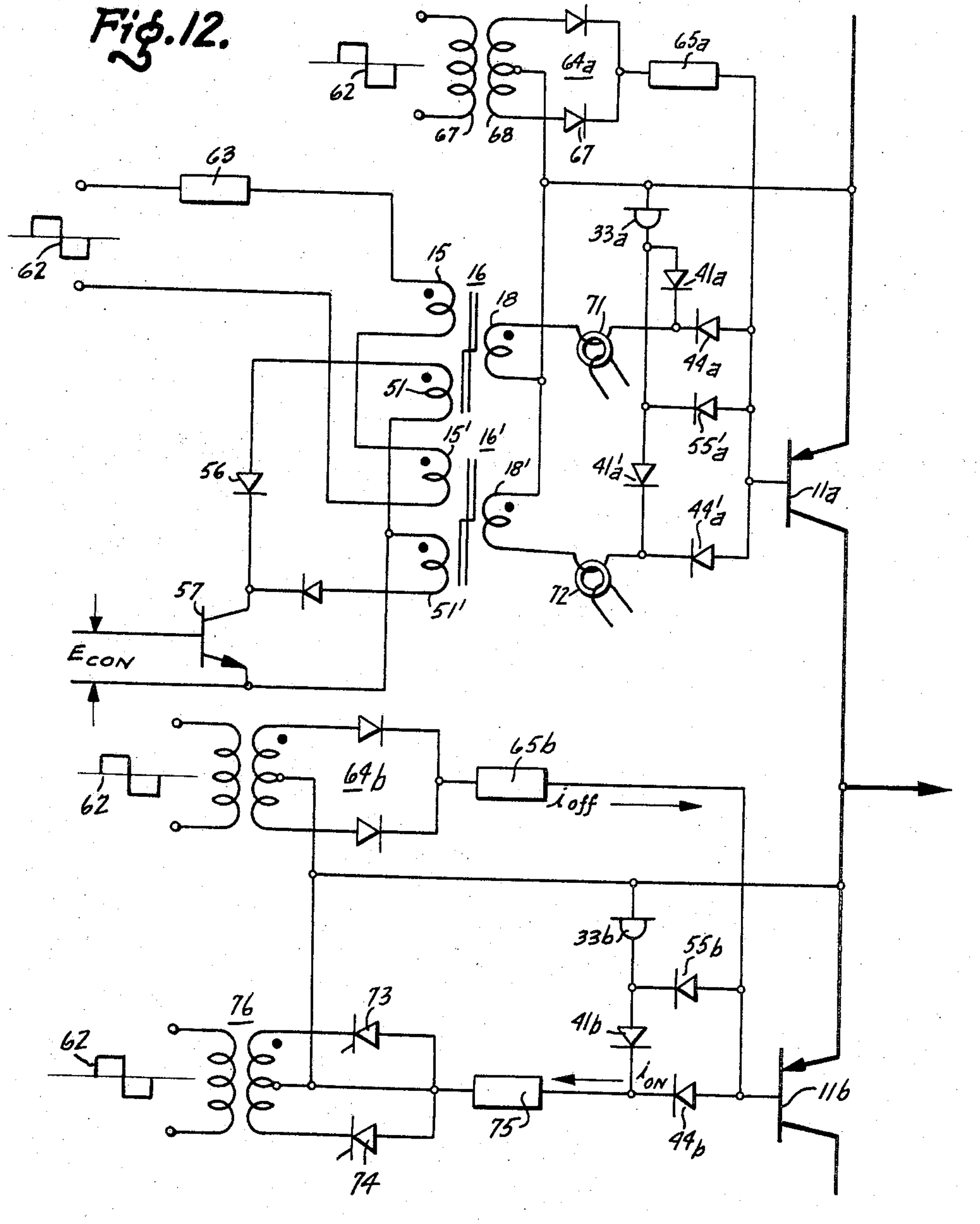

FIGURE 12 is a detailed circuit diagram of one half of a bridge power inverter circuit, and illustrates the use of the high frequency chopping circuit arrangement of the present invention to control operation of the bridge power inverter; and FIGURE 13 is a schematic circuit diagram illustrating the manner of connection of the power transistors in the bridge power inverter controlled by the high frequency chopping circuit arrangement of FIGURE 12.

Figure 1:
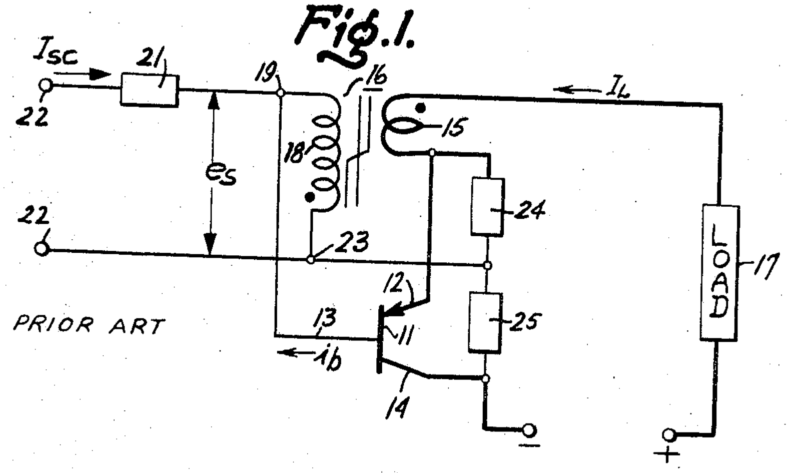
FIGURE 1 is a schematic circuit diagram of a prior art transistor-saturable core transformer chopping circuit arrangement which illustrates the manner of operation of one form of the present invention.

The transistor-saturable transformer chopper circuit shown in FIGURE 1 of the drawings is comprised by a power transistor 11 having an emitter 12, a base 13 and collector electrode 14. The transistor 11 may comprise any germanium power transistor (such as the General Electric 2N1907) but may also comprise silicon and may be either a PNP of NPN junction transistor. In the particular arrangement shown in FIGURE 1, germanium PNP junction transistor configuration is employed wherein the emitter electrode 12 is connected through the primary winding 15 of a saturable core transformer 16 and a load 17 to a source of direct current operating potential indicated by the + and − signs. The saturable core transformer 16 has a secondary winding 18 which is wound on a common saturable core member (not shown) with the primary winding 15. Hence, secondary winding 18 is inductively coupled to the primary winding 15 during those intervals when the core member is unsaturated. The secondary winding 18 has one of its terminals 19 connected directly to the base of the power transistor 11 and through a limiting resistor 21 to a source of control or reset current connected across the terminals 22. The remaining terminal 23 of secondary winding 18 is connected to the terminal 22 of the source of control or reset signals $i_{sc}$, and is also connected to the juncture of a pair of bias resistors 24 and 25. The bias resistors 24 and 25 are connected in series circuit relationship between the emitter 12 and collector 14 of power transistor 11, and hence are connected through winding 15 and load 17 across the direct current power supply. The collector 14 of power transistor 11 is connected to the negative terminal (−) of the direct current power supply.

For a more detailed description of the manner of operation of the transistor-saturable transformer chopping circuit arrangement of FIGURE 1, reference is made to U.S. Patent No. 3,102,206 entitled, "Saturable Current Transformer-Transistor Circuit," issued Aug. 27, 1963, Raymond E. Morgan inventor, assigned to the General Electric Company. Briefly, however the circuit operates in the following described manner. Assuming the power transistor 11 to be in its nonconducting condition, the bias across the bias resistors 24 and 25 will cause a small base current $i_b$ to flow in the emitter-base of power transistor 11. This small emitter-base current due to the current gain of the power transistor 11 will cause a somewhat larger load current $i_L$ to flow in the emitter-collector circuit of power transistor 11. This somewhat larger load current $i_L$ flowing in the primary winding portion 15 of saturable core transformer 16 is sufficient to unsaturate transformer 16, and is transformed into the secondary winding 18 to cause a larger emitter-base current $i_b$ to flow through the transistor thereby turning it full on almost instantaneously. Power transistor 11 then continues to conduct and to supply load current $i_L$ to the load 17 for the period of time for the saturable core transformer 16 to be driven into its positive saturation condition where the core is positive at the dot end of winding 15. Upon the core of the saturable transformer 16 reaching positive saturation, the primary winding 15 and secondary winding 18 are decoupled thereby allowing the base current $i_b$ to drop towards zero and to start to turn off the power transistor 11. As the power transistor 11 starts to turn off, the load current decays, and this decay of the load current $i_L$ in the primary winding 15 will unsaturate the secondary winding 18 and start driving it back towards its negative saturation condition. This results in producing a reverse polarity potential across the secondary winding 18 which reverse biases the emitter-base of power transistor 11 causing it to be turned full off. The power transistor 11 will then be maintained off for the period of time required to drive the core of saturable core transformer 16 back into its negative saturation condition, and this time is determined by the value of the control or reset current $i_{sc}$ supplied through the secondary winding 18 from terminals 22.

Figure 2:
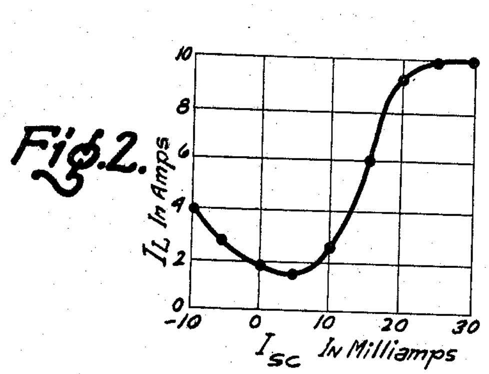
FIGURE 2 is a characteristic curve showing the control current versus load current characteristic of the circuit of FIGURE 1.

FIGURE 2 of the drawings is a characteristic curve illustrating the value of the load current $i_L$ obtained from the circuit arrangement of FIGURE 1 for variations in the value of the control or reset current $i_{sc}$ supplied from terminals 22. From an examination of FIGURE 2 it can be appreciated that for small values of control or reset current $i_{sc}$, it takes a longer period of time to reset the core of transformer 16 to negative saturation so that power transistor 11 remains off for longer periods of time, and hence a smaller load current $i_L$ is supplied to load 17. For larger values of the control or reset current $i_{sc}$, reset is achieved in a shorter period of time so that proportionally the power transistor 11 is turned on and conducting for greater periods of time, and hence larger values of load current $i_L$ are supplied to load 17.

Figure 3:
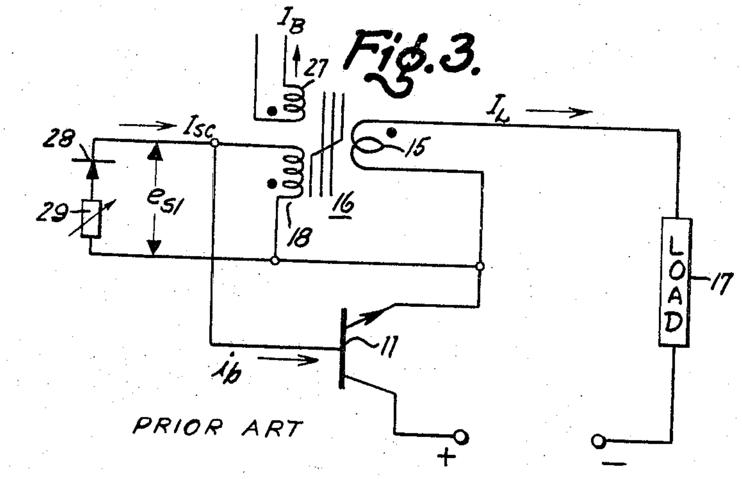
FIGURE 3 is a modified form of the prior art circuit shown in FIGURE 1 illustrating a technique for independently controlling the reset and hence the power output of the circuit.

FIGURE 3 of the drawings is a modified form of the transistor-saturable transformer chopper circuit arrangement of FIGURE 1. In the circuit arrangement of FIGURE 3, an NPN junction power transistor 11 has been employed in place of the PNP power transistor used in the circuit arrangement of FIGURE 1, and the bias resistors 24 and 25 have been omitted for the purpose of simplicity. In addition to the above difference, a separate bias or reset winding 27 is wound on the core of saturable transformer 16 in common with the primary winding 15 and secondary winding 18. The reset winding 27 has a fixed value bias or reset current $I_B$ flowing therethrough which tends to reset the core of saturable core transformer 16 towards negative saturation at all times. The ampere turns of the bias or reset winding 27 are opposed by the ampere turns of the secondary winding 18 supplied through a closed circuit control arrangement including a diode rectifier 28 and variable resistor 29 connected in series circuit relationship across the secondary winding 18. By varying the value of the variable resistor 29, the current flowing in the secondary winding 18 during reset can be varied to thereby vary the ampere-turns opposing reset of the core of saturable core transformer 16 by the ampere-turns of the bias or reset winding 27. Accordingly, it can be appreciated that by merely varying the value of the resistor 29, the reset period and hence period of time that the power transistor 11 is turned off, can be varied to thereby vary the load current $i_L$ supplied to load 17 in the same manner achieved by varying the value of the bias current $i_{sc}$ with the circuit arrangement of FIGURE 1.

The new power transistors, such as the Texas Instrument 2N1907, which can be employed in the known transistor-saturable core transformer chopping circuit arrangements of FIGURES 1 and 3, and their known equivalents, are capable of switching the load current through the transistor in a time period of one tenth of a microsecond or less. However, in order to accomplish switching of the load current within this short time interval, the base current of the power transistor must be switched in much less than one tenth of a microsecond in order to switch the load current within the one tenth of a microsecond interval. Most saturable core transformers having satisfactory gain and design parameters can switch the base current of a power transistor in 1 to 2 microseconds only, however, and in order to design saturable core transformers capable of switching the base current of a power transistor in periods of time less than 1/10 of a microsecond, a considerable sacrifice in the gain and design parameters of the transformer would be required. In order to overcome the difficulties presented by this situation, the circuit arrangement illustrated schematically in FIGURE 4 was devised.

Figure 4:
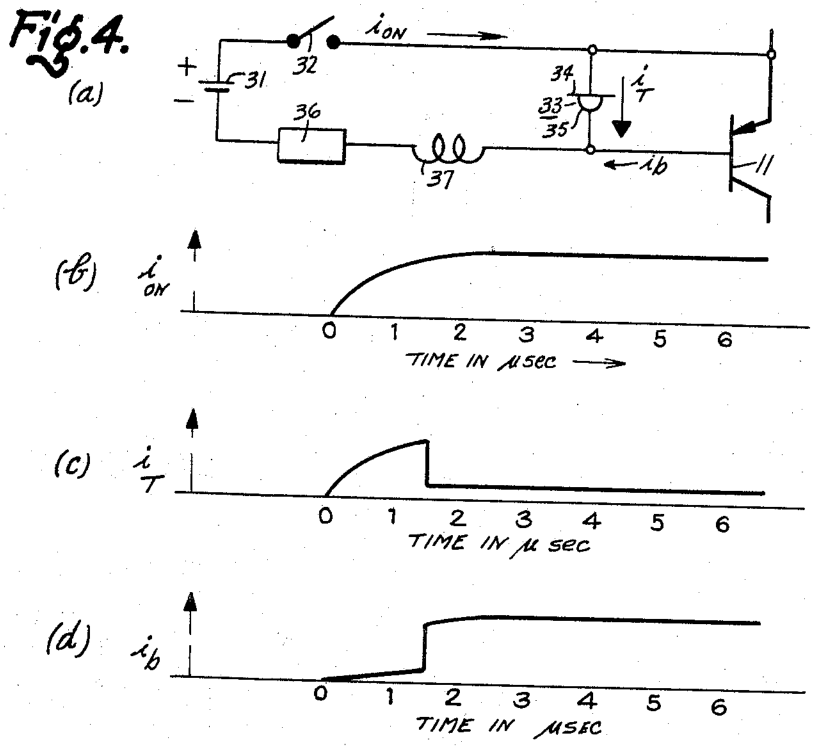
FIGURE 4 is a schematic circuit diagram of a tunnel diode power transistor switching circuit arrangement constructed in accordance with the invention together with a series of characteristic curves illustrating the manner of operation of the arrangement.

In the circuit arrangement of FIGURE 4, a battery 31 and switch 32 are used to depict the switching saturable core transformer employed in the circuit arrangements of FIGURES 1 and 3, for example since these elements will perform equivalent circuit function of the saturable core transformer. As shown in FIGURE 4*a*, the battery 31 and switch 32 are connected across the emitter-base of the power transistor 11. In addition, a tunnel diode 33 is connected across the emitter-base of the power transistor 11 with the anode 34 of the tunnel diode being connected to the emitter of transistor 11 and the cathode 35 of the tunnel diode being connected to the base of power transistor 11. The resistance of the leads and conductors inter-connecting these elements is shown at 36 and the distributed inductance of the leads is illustrated at 37 since each of these values will affect operation of the circuit.

Figures 5, 6:
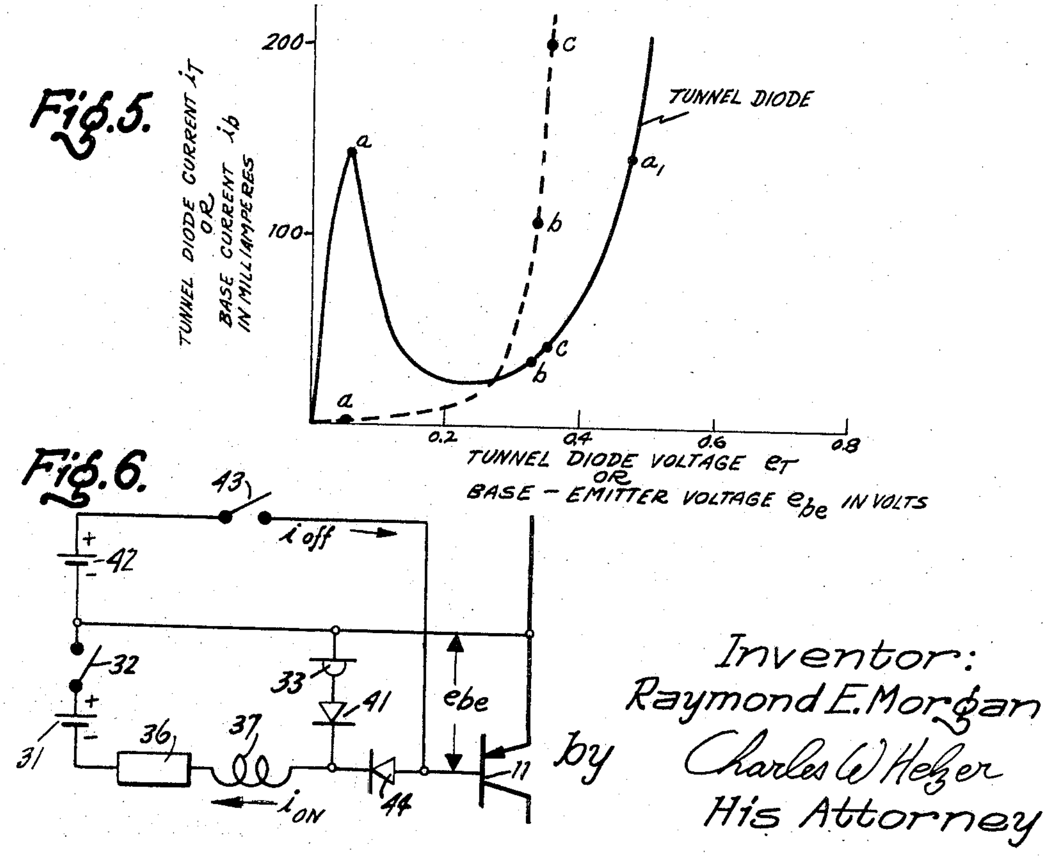
FIGURE 5 is a pair of voltage versus current characteristic curves for the circuit arrangement of FIGURE 4.
FIGURE 6 is a modified form of a tunnel diode-power transistor switching circuit arrangement constructed in accordance with the invention.

The wave forms shown in FIGURES 4*b* through 4*d* of the drawings considered in conjunction with FIGURE 5 of the drawings illustrates the manner of operation of the tunnel diode 33 to achieve very fast switching of the base current of the power transistor 11. If at time zero in FIGURE 4*b* the switch 32 is closed, the rise in current $i_{on}$ flowing through the circuit of FIGURE 4*a* would be as shown in FIGURE 4*b*. This current would cause a small current $i_b$ to flow in the emitter-base circuit of power transistor 11 as well as a current $i_t$ flowing through the tunnel diode 33. As shown in FIGURE 5 of the drawings, the current through the tunnel diode $i_t$ will initially greatly exceed the base current as can be appreciated by comparing the values of the two currents at a point in time marked *a* in FIGURE 5. Upon the current through the tunnel diode 33 reaching the value indicated at point *a* in FIGURE 5, the voltage across the tunnel diode will suddenly shift to its higher value indicated at point $a_1$ due to the well known tunneling characteristic of the tunnel diode. This shift to a higher voltage is accomplished practically instantaneously so that it can be appreciated that the emitter-base of the power transistor 11 is subjected to an instantaneous increase in potential across it. This results in a sudden rise in current through the emitter-base of the power transistor 11 as depicted by the dotted line in FIGURE 5. As a consequence of the rise in current through the emitter base of the power transistor 11 it is switched to its full on condition in a very short period of time less than .02 microsecond. Subsequently, the current through the tunnel diode will drop from the position shown at point $a_1$ to the position shown at point *b* at the same time that the current through the emitter-base of the power transistor 11 rises to the point *b* shown in FIGURE 5. Thereafter the current through each of the devices shifts to the point *c* as the current continues to rise through the circuit until it reaches its steady state value determined by the value of the parameters 36 and 37 as well as the voltage of the source 31. The current through the tunnel diode $i_t$ is illustrated by the curve shown in FIGURE 4*c* of the drawings wherein it can be seen that the current $i_t$ rises until it reaches the point *a* and then immediately drops to its lower value as the tunnel diode shifts to its higher voltage mode of operation. Concurrently, the base current $i_b$ flowing in the emitter-base of the power transistor 11 increases very slowly until the time that the current through tunnel diode reaches the point *a* and the tunnel diode shifts to its higher voltage mode of operation, and then the current $i_b$ rises almost instantaneously to almost its ultimate limiting value. The tunnel diode and base-emitter characteristic illustrated in FIGURES 4 and 5 are shown for a germanium power transistor unit such as the 2N1907, and for a germanium tunnel diode such as the GE 1N3851 connected in parallel with a 1N3850. If silicon power transistors are preferred, then a silicon tunnel diode such as the 1N2933 and 1N2934 could be used in place of those illustrated. The combination of germanium power transistors together with germanium tunnel diodes is preferred, however, since the germanium power transistors have a lower base-emitter voltage drop when turned on (hence less power loss) and they cost less than the silicon power transistors. The silicon power transistors, however, may be preferred for high temperature applications.

The use of a tunnel diode 33 to accomplish fast turn on of the power transistor 11 as explained in connection with FIGURES 4 and 5 is quite effective. However, the tunnel diode by its presence alone can prevent fast turn off of the power transistor 11. Since in order to accomplish high frequency chopping, it is imperative that the transistor not only be turned on fast, but that it also be turned off fast to achieve the desired end. To accomplish this, the circuit modifications shown in FIGURE 6 are included. In the circuit arrangement shown in FIGURE 6, a blocking diode is connected in series circuit relationship with the tunnel diode 33 in a manner such that current flows through both the tunnel diode and blocking diode 41 in the same direction. The series circuit comprised by tunnel diode 33 and blocking diode 41 is connected across the emitter-base of the power transistor 11, and a source of reverse bias voltage 42 and series connected switch 43 likewise are connected across the emitter-base of power transistor 11. Because the inclusion of the blocking diode 41 may cause a mismatch in the impedance between the tunnel diode 33 and the emitter-base of power transistor 11, an impedance matching diode 44 (or diodes) is connected in series circuit relationship with the emitter-base of power transistor 11. The series circuit comprised by the tunnel diode 33 and blocking diode 41 is then connected in parallel circuit relationship with the series circuit comprised by the impedance matching diode 44 and the emitter-base of power transistor 11. By this arrangement, when the switch 43 is closed and the switch 32 concurrently opened, a reverse bias potential will be applied across the emitter-base of power transistor 11 thereby causing it to quickly turn off since the reverse bias potential from the source 42 will be blocked by blocking diode 41. The added voltage drop across impedance matching diode 44 serves to maintain the voltage current relationship between tunnel diode 33 and the emitter-base of transistor 11 as illustrated in FIGURE 5 of the drawings.

Figure 7:
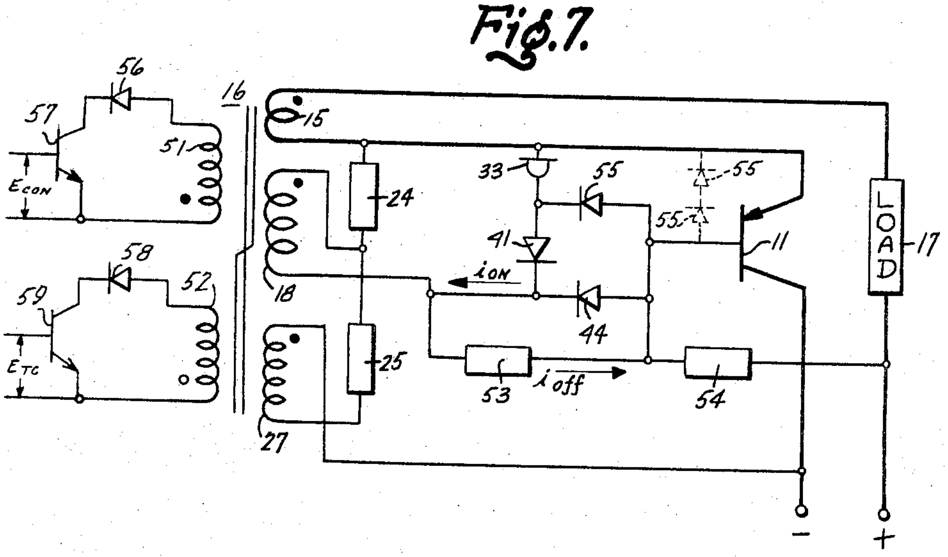
FIGURE 7 is a schematic circuit diagram of one preferred form of high frequency chopping circuit constructed in accordance with the invention.

FIGURE 7 is a detailed circuit diagram of a practical high frequency chopped circuit constructed in accordance with the features of the present invention. In the circuit of FIGURE 7, a PNP power transistor 11 has its emitter-base connected through the primary winding 15 of a saturable core transformer 16 and a load 17 across the terminals (+ and −) of a direct current power supply. The primary winding 15 is wound on a common core member (not shown) with a secondary winding 18, a reset winding 27, a first control winding 51, and a second control or turn off winding 52 all of which are of course inductively coupled to the primary winding 15 through the medium of the common saturable core member. The reset winding 27 is connected in series circuit relationship with a pair of resistors 24 and 25 across the emitter-collector of power transistor 11, and hence are connected across the terminals (+ and −) of the direct current power supply through primary winding 15 and load 17. The dot end of the secondary winding 18 is connected to the juncture of the bias resistors 24 and 25, and the no dot end of winding 18 is connected through an impedance matching diode 44 to the base of the power transistor 11. The no dot end of secondary winding 18 is also connected through a pair of series connected bias resistors 53 and 54 to the positive terminal of the direct current power supply with the juncture of the bias resistors 53 and 54 being connected directly to the base of power transistor 11. The series circuit comprised by the impedance matching diode 44 and the emitter-base of power transistor 11 is connected in parallel circuit relationship with a series circuit comprised by a tunnel diode 33 and series connected blocking diode 41. A clamping diode 55 shown in solid line is operatively connected in parallel circuit relationship across the emitter-base of power transistor 11 in a reverse polarity sense with respect to the blocking diode 41. The purpose of the clamping diode 55 will be appreciated more fully hereinafter. If desired, the clamping diode 55 may be connected in the manner shown by the dotted diodes 55 to accomplish the same purpose.

Continuous control over the load current supplied to the load 17 by the circuit arrangement of FIGURE 7 is accomplished with the first control winding 51 which is connected in series circuit relationship with a diode 56 across the emitter-collector of an NPN junction transistor 57. The NPN junction transistor 57 has its emitter-base connected to a source of continuously variable control signals which of course will vary the conductance of the NPN junction transistor 57. Similarly, the second control turn off winding 52 is connected in series with a diode 58 across the emitter-collector of an NPN junction transistor 59 with its base connected to a source of turn off control signals. By a comparison of the circuit of FIGURE 7 to the circuit shown in FIGURE 3, it can be appreciated that by varying the conductance of the transistor 57, for example, the ampere turns of winding 51 acting on the core of saturable core transformer 16 can be varied in precisely the same manner as obtained with the variable resistor 29 of the circuit arrangement shown in FIGURE 3. Similarly, by varying the conductance of the transistor 59, the ampere turns of the winding 52 acting on the core of saturable core transformer 16 can be varied. The turn off control signal applied to the transistor 59 differs from the continuously variable control signal applied to transistor 57, however, in that the transistor 59 is either turned full on or full off. Accordingly, if the transistor 59 is turned full on by the turn off control signal $E_{tc}$ applied to its base, the ampere turns of winding 52 will exactly oppose the ampere turns of the reset winding 27 so that the core of saturable core transformer 16 cannot be reset thereby cutting off the load current supply to the load 17. With the transistor 59 turned full off, the winding 52 will have no effect on the core of saturable core transformer 16. Accordingly, it can be appreciated that by connecting the base of the transistor 59 to the output of an overcurrent sensor, an over voltage sensor, or some other sensing control, operation of the circuit of FIGURE 7 can be stopped instantaneously in response to a protective turn off control signal applied to the transistor 59. Simultaneously, a continuously variable control signal $E_{con}$ supplied to the base of the transistor 57 can be used to continuously vary the value of the load current being supplied to the load 17 in response to a desired control program.

Having described the construction of FIGURE 7 and the manner of its control in the preceding paragraph, its overall operation is as follows. Consider the power transsistor 11 to be in its nonconducting condition and that the core of the saturable core transformer 16 has been driven into its negative saturation condition by the reset current flowing in the reset winding 27 at the end of a previous cycle of operation. With the circuit in this condition, a small negative bias will be applied from the bias resistors 24 and 25 to the cathode of tunnel diode 33 and to the base of PNP power transistor 11. This causes the tunnel diode to be rendered conductive and causes a small emitter-base current to flow in the power transistor 11 as explained in connection with FIGURES 4 and 5. This small emitter-base current is sufficient to cause a collector current to flow through the primary winding 15 that will cause the core of transformer 16 to be unsaturated, and to induce a potential in the secondary winding 18 which is negative at the dot end. This induced potential in the secondary winding 18 causes a larger current flow through the tunnel diode 33, and a larger emitter-base current flow through a power transistor 11. Thereafter, as the current flow through the tunnel diode 33 increases to the point *a* in FIGURE 5 so that it is switched to its high voltage mode of operation, the power transistor 11 will be switched to its full on condition almost instantaneously. This increases the collector current flow, hence the load current flow, and continues driving the core of saturable core transformer 16 towards its positive or opposite condition of saturation. Thereafter, the power transistor 11 will continue to conduct and supply load current through the load 17 for the period of time required to drive the core of saturable core transformer 16 into positive saturation.

Upon the core of saturable core transformer 16 reaching positive saturation, the primary and secondary windings 15 and 18 will be decoupled so that the potential across winding 18 drops essentially to zero. With the potential across the winding 18 substantially zero, the bias potential continuously applied from the bias resistors 53 and 54 to the base of power transistor 11 will take over and reverse bias the base-emitter of the power transistor 11 thereby causing it to turn off almost instantaneously. This instantaneous application of the reverse bias across the emitter-base of power transistor 11 is made possible by the presence of the blocking diode 41 which prevents the reverse bias from being dissipated through tunnel diode 33.

At the instant that the power transistor 11 is turned off, the load current through the primary winding 15 will decay to zero almost instantaneously, and the collapsing lines of flux in the saturable core transformer 16 will unsaturate the core of transformer 16 and generate in the the secondary winding 18 a reverse polarity potential which now will be positive at the no dot end of winding 18. In order to dissipate this induced potential across winding 18 during turn off, the clamping diode 55 is provided thereby avoiding any risk of injury to the emitter-base of the power transistor 11. It should be noted that the clamping diode may be connected in the manner shown in solid lines, or alternatively may be connected as shown by the dotted outline form, or in any other manner so long as it effectively shunts the emitter-base of the power transistor 11 insofar as this reverse polarity potential generated by winding 18 is concerned.

With the power transistor 11 turned off in the above described manner, the circuit is returned to its initial condition of operation ready for a new cycle of operation. By varying the value of the continuously variable control signal $E_{con}$ applied to the base of the transistor 57, the point at which the core of saturable core transformer 16 reaches positive saturation to thereby initiate turn off of the power transistor 11 in the above described manner, can be varied to thereby vary the period of conduction or time on of the power transistor 11. This results in varying the value of the load current being supplied to load 17 in a proportional control manner as previously described in more detail in the above-identified Morgan Patent No. 3,102,206. In the event of the application of the turn-off signal $E_{tc}$ to the base of the transistor 59, the circuit of FIGURE 7 will be turned off practically concurrently with application of the turn-off signal thereby making it possible to protect the power transistor in the circuit from possible damage. It should also be appreciated that the number of additional turn-off windings such as 52 which can be added to the saturable core transformed 16 is practically limitless (within reason) since these windings do not affect operation of the circuit until a turn-off signal is applied to them. For this reason, the circuit makes it possible to provide multiple insulated input signals to the circuit which are effectively isolated from the power current flowing in the power circuit.

Figure 8:
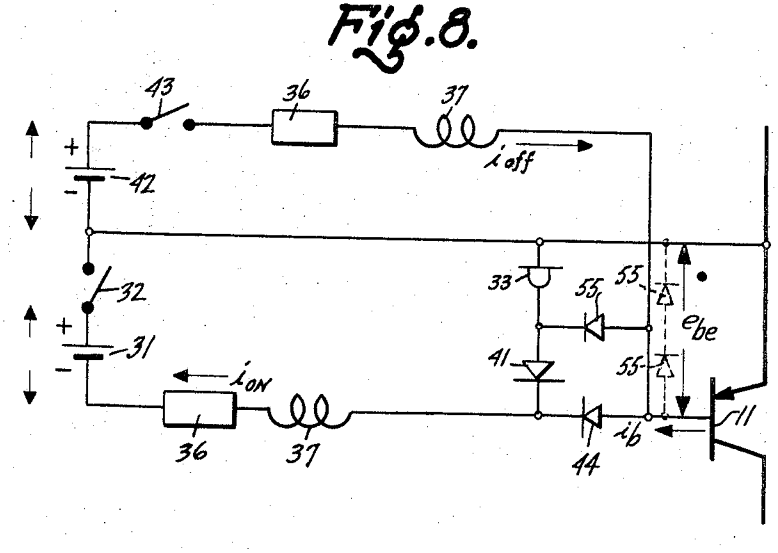
FIGURE 8 is an equivalent circuit diagram of the preferred high frequency chopping circuit arrangement of FIGURE 7 illustrating the impedances and voltages which affect operation of the circuit.

FIGURE 8 of the drawings is an equivalent circuit arrangement of the circuit shown in FIGURE 7. With respect to FIGURE 8, the switches 32 and 43 are effectively provided by the winding 18 of saturable core transformer 16 which, dependent upon its condition whether saturated or unsaturated, the switch is either open or closed. With winding 18 in its saturated condition, the circuit operates as though switch 43 were closed in FIGURE 8 and switch 32 opened. With winding 18 in its unsaturated condition, the circuit operates as through the switch 32 were closed and the switch 43 were opened.

Figure 9:
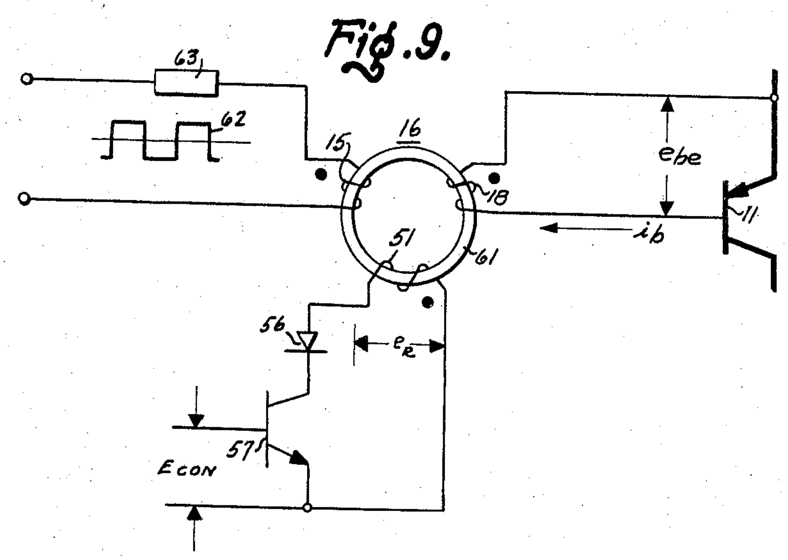
FIGURE 9 is a schematic circuit diagram of still a different form of saturable core transformer-transistor chopping circuit constructed in accordance with the invention.

FIGURE 9 of the drawings illustrates the basic circuit configuration of a form of high frequency chopper circuit having a constant frequency output and wherein the the time on of the power transistor is varied to thereby vary the load current supplied to a load through the power transistor. In the circuit arrangement of FIGURE 9 a power transistor 11 has its emitter-base coupled across the secondary winding 18 of a saturable core transformer 16. The secondary winding 18 is wound in common on a toroidal core member 61 with a primary winding 15 and a control winding 51 in a conventional fashion. Primary winding 15 is connected to a source of square wave alternating current potential having the wave form illustrated at 62 through a current limiting resistor 63. The control winding 51 is connected through a diode 56 across the emitter-collector of an NPN junction transistor 57 whose base is connected to a source of control signals $E_{con}$.

For the purpose of illustration, first consider the case where there is no control signal $E_{con}$ applied to transistor 57, and hence control winding 51 has no effect on the operation of the circuit. Consider also that the core of saturable core transformer 16 has been driven into negative saturation by the previous negative half cycle of the square wave alternating current potential 62 supplied to primary winding 15. Under these circumstances, the positive half-cycle of the square wave alternating current potential 62 will drive the core of saturable core transformer 16 out of negative saturation and tend to reset it towards positive saturation. As a consequence, a potential will be developed in the secondary winding 18 which is negative at the dot end and which will cause power transistor 11 to be turned on. The power transistor 11 will then be maintained turned on for the period of time required for the core of saturable core transformer 16 to be driven into positive saturation by the positive half-cycle of the square wave alternating current potential 62. By proper design of the core of transformer 16 and the windings 15, 51, and 18, the transformer 16 can be designed so that its core is driven into positive saturation at the termination of the positive half-cycle of the square wave alternating current potential 62 assuming no control signal is applied to the transistor 57. Upon reaching poistive saturation, the potential across winding 18 will drop to zero. As a consequence, the emitter-base current of transistor 11 decreases to zero and the power transistor 11 will start to turn off. During the succeeding negative half-cycle of the square wave alternating current potential 62, the core of saturable core transformer 16 will be driven out of positive saturation towards negative saturation and will develop a reverse polarity potential across the winding 18 which is now positive at the dot end. As a consequence, the power transistor 11 will be turned full off during the negative half-cycle of square wave potential 62, and the core of the saturable core transformer 16 will be driven back into negative saturation during the negative half-cycles.

Consider now the effect of the transistor 57 and diode 56. By reason of the polarity of the connection of the diode 56, the diode will block any current flow during the positive half-cycles of the square wave potential 62 so that no current can flow through winding 51 during the positive half-cycles, and hence the winding will have no effect during these periods. However, during the negative half-cycles of the applied square wave potential 62 an enabling potential $e_r$ of the proper polarity will be developed across the winding 51 which is applied across the collector-emitter of transistor 57. If under these conditions the control signal $E_{con}$ which is positive in nature is applied to the base of transistor 57 the transistor will be turned on. The amount of current that is allowed to flow through the transistor will of course be determined by the value of the control signal $E_{con}$. From a consideration of FIGURE 9 it can be appreciated that the ampere turns caused by the winding 51 oppose the ampere turns of primary winding 15 during the negative half-cycle of the square wave alternating current potential 62. Therefor in effect the control winding 51 controls the degree of reset of the core of saturable core transformer 16 during the negative half-cycles of potential 62. By thus controlling the degree of reset, or the extent to which the core of saturable core transformer 16 is driven toward negative saturation during the negative half-cycles of the applied square wave alternating current potential 62, the control winding 51 in effect sets the amount of time which will be required for the succeeding positive half-cycle of the square wave alternating current potential 62 to drive the core 61 into positive saturation, and hence, thereby controls the on time of the power transistor 11. Thus, it can be appreciated that the power transistor 11 will be turned on at a constant frequency rate, but that its on time is varied to thereby vary the value of the load current being supplied through the power transistor.

Figure 10:
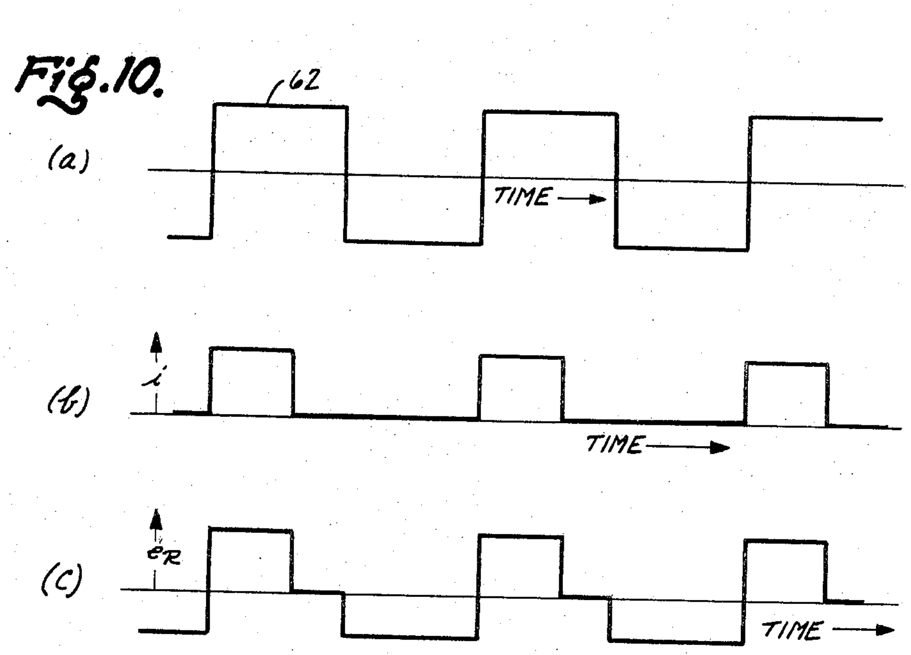
FIGURE 10 is a series of current versus time characteristic curves illustrating the mode of operation of the circuit of FIGURE 9.

FIGURE 10 of the drawings illustrates the manner of operation of the circuit of FIGURE 9. FIGURE 10(*a*) illustrates the voltage-time characteristic of the square wave alternating current potential 62 applied to primary winding. In FIGURE 10(*b*), the current versus time characteristic of the base current $i_b$ is shown for the condition where the core of saturable core transformer 16 is driven into positive saturation at about 120° phase relation with respect to the applied square wave switching potential 62. The potential $e_r$ appearing across the control winding 51 is illustrated in FIGURE 10(*c*). By varying the value of the control signal $E_{con}$ supplied to the base of transistor 57 the value of $i_b$ can be either increased or decreased to thereby vary the on time (and hence load current) of the power transistor 11 in a desired fashion.

Figure 11:
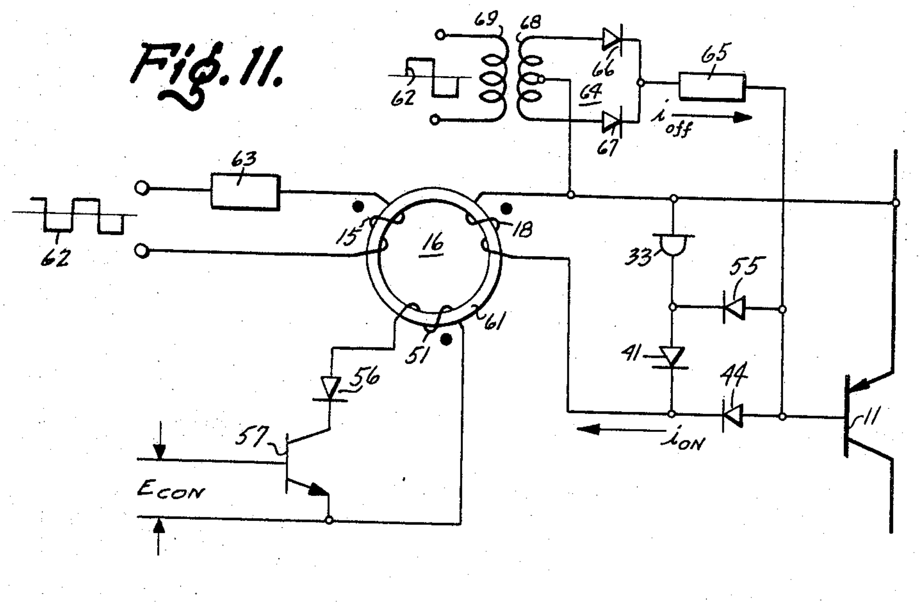
FIGURE 11 is a schematic circuit diagram of a high frequency chopping circuit employing the modified form of saturable core transformer used in the circuit arrangement of FIGURE 9.

FIGURE 11 of the drawings illustrates a practical circuit configuration for a constant frequency, high speed time ratio control power chopping circuit constructed in accordance with the principles of the present invention. The circuit arrangement of FIGURE 11 is identical to the circuit of FIGURE 9 with the exception that a tunnel diode 33 and blocking diode 41 are connected in series circuit relationship across the base-emitter of power transistor 11 and a series connected impedance matching diode 44. By the addition of these elements to the circuit arrangement of FIGURE 9, high speed turn on the power transistor 11 can be accomplished in the manner described more fully with relation to FIGURES 4 and 5 of the drawings.

In order to accomplish high speed turn off of the power transistor 11 in FIGURE 11, a source of reverse polarity potential is connected in parallel circuit relationship with the emitter-base of power transistor 11. This source of reverse polarity potentialmay be a battery or other suitable D.C. source, but in the specific arrangement shown in FIGURE 11, is comprised by a rectifier circuit 64 and series connected resistor 65 connected across the emitter-base of power transistor 11. The rectifier circuit 64 is comprised by a pair of diodes 66 and 67 connected in back-to-back relationship across the secondary winding 68 of a coupling transformer whose primary winding 69 is coupled to the source of square wave alternating current potential 62 applied to primary winding 15 of saturable core transformer 16. By this arrangement, upon the secondary winding 18 being driven into positive saturation, the reverse polarity potential developed across the resistor 65 will reversely bias the emitter-base of power transistor 11 to cause it to quickly turn off. A clamping diode 55 operatively connected in parallel with the emitter-base of power transistor 11 will serve to clamp the emitter-base potential to the voltage drop across the diode and tunnel diode 33 during turn off thereby avoiding any possible damage to the power transistor 11.

FIGURE 12 of the drawings shows a form of high frequency chopping circuit which can be applied to the bridge inverter network of FIGURE 13 to provide either an alternating current output voltage or a reversible polarity direct current output voltage depending upon how the network is operated. For the purpose of the present discussion, ignore for the time being the lower half of the circuit including the power transistor 11*b* and its associated circuitry (FIGURE 12) and the two pulse transformers 71 and 72. The saturable core transformer 16 in the circuit arrangement shown in FIGURE 12 is in fact two saturable core transformers 16 and 16′ which in effect operate similar to the transformer 16 of the circuit arrangement shown in FIGURE 11. However, in the circuit arrangement of FIGURE 12, one of the saturable core transformers 16 operates on one-half cycle of the applied square wave alternating current potential 62 as discussed in connection with the circuit of FIGURE 11, and the remaining saturable core transformer 16′ operates on the opposite half-cycle so that the two together provide full wave control to the power transistor 11*a* similar to a full wave magnetic amplifier. With the control signal $E_{con}$ applied to the transistor 57 equal to zero, the power transistor 11*a* will be turned on or conducting for a full 360° of the square wave alternating current potential 62. As the value of the control signal $E_{con}$ is increased, the conducting time of the power transistor 11*a* is reduced proportionally until it finally reaches zero for $E_{con}$ equal to full value. Full wave operation of the power transistor 11*a* in this manner provides a chopping rate which is double the frequency of the square wave alternating current potential 62.

With the circuit thus far described, therefore, it can be appreciated that the control voltage $E_{con}$ controls the output voltage to the load. Since the control winding 51, 51′ of the saturable core transformers 16 and 16′ are wound on separate parts of the core from the primary and secondary windings, the separation of the windings isolates the input circuits from each other and from the power output circuit, and in addition provides insulation. Pulses of voltage, fast rise time in voltage, etc. between the various input control circuits and the output power circuit do not disturb the input controls applied to the circuit. Further, as explained in connection with FIGURE 7, additional multiple input and turn off controls can be applied to the core members of the saturable core transformers 16, 16′ to provide any desired number of inputs which are insulated and isolated from each other and from the power load circuit as well.

Considering now the effect of the lower half of the circuit shown in FIGURE 12 including the power transistor 11*b* where such a control circuit is included as the left half control for a bridge circuit such as that illustrated in FIGURE 13, for example. A bridge circuit so constructed can be employed to develop either an alternating current potential or a reversible polarity variable direct current output voltage across the load depending upon the nature of the control signals supplied to circuit. It is to be understood that a right hand control circuit similar to that of FIGURE 12 would be connected to the power transistors 11*a′* and 11*b′* of the circuit shown in FIGURE 13 for such operation, however.

The control circuit for the power transistor 11*b* is slaved to the control circuit of power transistor 11*a* in the circuit arrangement shown in FIGURE 12. The pulse transformers 71 and 72 supply pulses as described in detail later to the control gates of a pair of silicon controlled switches (SCS) 73 and 74 that are connected through a limiting resistor 75 and impedance matching diode 44*b* to the base of power transistor 11*b*. Alternating current power is supplied to the silicon controlled switches 73 and 74 through a supply transformer 76 having its primary winding coupled to the source of square wave alternating current potential 62. The tunnel diode switching circuit comprised by tunnel diode 33*b* and working diode 41*b* assures fast turn on of the power transistor 11*b*, and fast turn off of power transistor 11*b* is accomplished through the rectifier 64*b* and resistor 65*b* which reverse bias the emitter-base of power transistor 11*b*.

By the above arrangement, power transistor 11*b* is turned on at the time that power transistor 11*a* is turned off. The tunnel diode fast switching circuit including tunnel diode 33*b* switches the power transistor 11*b* in a fast manner the same as diode 33 in the circuit arrangement of FIGURE 11. When the core of the saturable core transformers 16 or 16′ saturates, the flux in the cores of the pulse transformers 71 or 72 drops to the residual flux level, and a voltage is induced in the secondary windings of the pulse transformers 71 or 72 to thereby turn on the SCS 73 or SCS 74. Turn on of SCS 73 or SCS 74 results in fast turn on of power transistor 11*b*. When incorporated in a bridge arrangement such as shown in FIGURE 13, the right hand power transistors 11*a′* and 11*b′* are controlled by an identical circuit to the one controlling power transistors 11*a* and 11*b* so that the control circuits can be used in series. With such an arrangement the emitter of the control transistors 57 used for the left side of the bridge would be connected to the emitter of the corresponding control transistor 57 used on the right side of the bridge circuit, and the control signal input is applied to the bases of both transistors.

By reason of the above construction, a transistor-magnetic power amplifier is made available having multiple insulated and isolated inputs. The high speed chopping amplifier employs a technique of time ratio control and provides lightweight, compactness, high efficiency and high reliability operation at very high switching speed made possible by the use of high speed power transistors used in conjunction with tunnel diode high speed switching circuits to permit high chopping frequencies. The multiple inputs made possible by the circuit permit take over control for such purposes as current limit, thermal limits, under voltage or over voltage, etc., and the isolation of the multiple inputs from each other and from the power output permit the take over controls to operate in circuits having high dv/dt which otherwise might interact on each other to cause circuit failure.

From the foregoing description, therefore, it can be appreciated that the invention makes available high speed chopping circuit arrangements which employ a high speed power transistor and a tunnel diode to accomplish high speed switching of the base current of the transistor to thereby achieve high chopping frequencies. The circuits thus comprised also employ saturable core transformers to provide multiple insulated inputs that are effectively isolated from each other and from the high frequency power derived at the output of the circuit.

Having described several embodiments of a high frequency chopping circuit constructed in accordance with the invention, it is believed obvious that other modifications and variations of the invention are possible in light of the above teachings. It is therefore to be understood that changes may be made in the particular embodiments of the invention described which are within the full intended scope of the invention as defined by the appended claims.

What I claim as new and desire to secure by Letters Patent of the United States is:

1. A high frequency transistor saturable transformer chopping circuit including in combination a power transistor having a base-emitter and an emitter-collector circuit, a saturable core transformer having at least inductively coupled primary and secondary windings, the primary winding being operatively connected in the emitter-collector circuit of the power transistor and the secondary winding being operatively connected in the emitter-base circuit of the transistor, means operatively connected in parallel circuit relationship with the emitter-base of the power transistor for increasing the switching speed of the power transistor, and a load operatively connected in series circuit relationship with the power transistor which in turn are connected across a source of operating potential, wherein the means for increasing the switching speed of the power transistor comprises a tunnel diode.

2. A high frequency transistor saturable transformer chopping circuit including in combination a power transistor having a base-emitter and an emitter-collector circuit, a saturable core transformer having at least inductively coupled primary and secondary windings, the primary winding being operatively connected in the emitter-collector circuit of the power transistor and the secondary winding being operatively connected in the emitter-base circuit of the transistor, means operatively connected in parallel circuit relationship with the emitter-base of the power transistor for increasing the switching speed of the power transistor, and a load operatively connected in series circuit relationship with the power transistor which in turn are connected across a source of operating potential, wherein the means for increasing the switching speed of the power transistor comprises a tunnel diode, and wherein the combination is further characterized by a blocking diode connected in series circuit relationship with the tunnel diode, the series circuit comprised by the series connected tunnel diode and blocking diode being connected in parallel circuit relationship with the emitter-base of the power transistor, and with the blocking diode being connected to conduct current in the same direction as the tunnel diode.

3. A high frequency transistor saturable transformer chopping circuit including in combination a power transistor having a base-emitter and an emitter-collector circuit, a saturable core transformer having at least inductively coupled primary and secondary windings, the primary winding being operatively connected in the emitter-collector circuit of the power transistor and the secondary winding being operatively connected in the emitter-base circuit of the transistor, means operatively connected in parallel circuit relationship with the emitter-base of the power transistor for increasing the switching speed of the power transistor, and a load operatively connected in series circuit relationship with the power transistor which in turn are connected across a source of operating potential, wherein the means for increasing the switching speed of the power transistor comprises a tunnel diode, and wherein the combination is further characterized by a blocking diode connected in series circuit relationship with the tunnel diode to conduct current in the same direction as the tunnel diode, an impedance matching diode connected in series circuit relationship with the emitter-base of the power transistor, the series circuit comprised by the tunnel diode and the blocking diode being connected in parallel circuit relationship with the series circuit comprised by the emitter-base of the power transistor and the impedance matching diode.

4. A high frequency transistor saturable transformer chopping circuit including in combination a power transistor having a base-emitter and emitter-collector circuit, a saturable core transformer having at least inductively coupled primary and secondary windings and a first control winding, the primary winding being operatively connected in the emitter-collector circuit of the power transistor and the secondary winding being operatively connected in the emitter-base circuit of the transistor, a tunnel diode and a blocking diode connected in series circuit relationship and adapted to conduct current in the same direction, an impedance matching diode connected in series circuit relationship with the emitter-base of the power transistor, the series connected tunnel diode and blocking diode being connected in parallel circuit relationship with the series connected impedance matching diode and emitter-base of the power transistor, a load operatively connected in series circuit relationship with the power transistor which in turn are connected across a source of operating potential, and a source of contintinuously variable control signals operatively coupled to the control winding of the saturable core transformer for controlling the operation of the chopping circuit.

5. The combination set forth in claim 4 further characterized by at least one additional turn-off control winding wound in common on the core of the saturable core transformer with the primary, secondary and first control windings and inductively coupled thereto, and a source of turn-off signals operatively coupled to the additional turn-off control winding for turning off the high frequency chopping circuit in response to a turn-off signal.

6. A high frequency transistor saturable transformer chopping circuit including in combination a power transistor having a base-emitter and an emitter-collector circuit, a saturable core transformer having at least inductively coupled primary and secondary windings, the primary winding being operatively connected in the emitter-collector circuit of the power transistor and the secondary winding being operatively connected in the emitter-base circuit of the transistor, a tunnel diode and a blocking diode connected in series circuit relationship and adapted to conduct current in the same direction, an impedance matching diode connected in series circuit relationship with the emitter-base of the power transistor, the series connected tunnel diode and blocking diode being connected in parallel circuit relationship with the series circuit comprised by the emitter-base of the power transistor and series connected impedance matching diode, a clamping diode operatively coupled in parallel circuit relationship with the emitter-base of the power transistor in a reverse polarity sense with respect to the series connected blocking diode and tunnel diode, and a load operatively connected in series circuit relationship with the power transistor which in turn are connected across a source of operating potential, whereby the power transistor controls load current flow to the load.

7. The combination set forth in claim 6 further characterized by a first control winding, at least one additional turn-off control winding and a reset winding all wound in common on the core of the saturable core transformer and inductively coupled to the primary and secondary windings, a source of continuously variable control signals operatively coupled to the first control winding for continuously controlling the operation of the high frequency chopping circuit, a source of turn-off signals operatively coupled to the additional turn-off control winding for turning off the high frequency chopping circuit in response to a turn-off signal, and a source of reset potential operatively connected to the reset winding for resetting the core of the saturable core transformer during the nonconducting intervals of the power transistor.

8. A transistor-saturable transformer chopper circuit including in combination a power transistor having a base-emitter circuit, a saturable core transformer having at least inductively coupled primary, secondary and control windings wound on a common saturable core member, the secondary winding being connected across the emitter-base of the power transistor, a source of alternating current set and reset potential operatively coupled to the primary winding for setting and resetting the core of the saturable core transformer at predetermined intervals, a continuously variable control signal source operatively coupled to the control winding for controlling the output of the chopping circuit, and means operatively connected in parallel circuit relationship with the emitter-base of the power transistor for increasing the switching speed of the power transistor, further characterized by a tunnel diode and a blocking diode connected in series circuit relationship and adapted to conduct current in the same direction, an impedance matching diode connected in series circuit relationship with the emitter-base of the power transistor, the series connected tunnel diode and blocking diode being connected in parallel circuit relationship with the series connected impedance matching diode and emitter-base of the power transistor, a clamping diode operatively coupled in parallel circuit relationship with the emitter-base of the power transistor in a reverse polarity sense with respect to the blocking diode, and a source of reverse polarity turn-off current operatively coupled in parallel circuit relationship with the emitter-base of the power transistor in parallel with the primary winding of the saturable core transformer.

9. A high frequency transistor-saturable core transformer chopping circuit including in combination a power transistor having a base-emitter circuit, a saturable core transformer having at least inductively coupled primary and secondary windings wound on a common saturable core member, the secondary winding being connected across the emitter-base of the power transistor, a source of alternating current set and reset potential operatively coupled to the primary winding for setting and resetting the core of the saturable core transformer, and means operatively connected in parallel circuit relationship with the emitter-base of the power transistor for increasing the switching speed of the power transistor, further characterized by a blocking diode connected in series circuit relationship with a tunnel diode and adapted to conduct current in the same direction, an impedance matching diode connected in series circuit relationship with the emitter-base of the power transistor, the series connected tunnel diode and blocking diode being connected in parallel circuit relationship with the series connected impedance matching diode and emitter-base of the power transistor, and a clamping diode operatively coupled in parallel circuit relationship with the emitter-base of the power transistor in a reverse polarity sense with respect to the blocking diode.

10. A high frequency switching circuit including in combination a power transistor having a base-emitter circuit, a source of high frequency switching signals operatively coupled across the base-emitter of the power transistor for switching the base-emitter current of the transistor at high speeds, and means operatively connected across the base-emitter of the power transistor in parallel with the switching signal source for increasing the switching speed of the power transistor, further characterized by a blocking diode connected in series circuit relationship with a tunnel diode and adapted to conduct current in the same direction as the tunnel diode, and an impedance matching diode connected in series with the emitter-base of the power transistor, the series circuit comprised by the tunnel diode and blocking diode being connected in parallel circuit relationship with the series circuit comprised by the impedance matching diode and the emitter-base of the power transistor.

11. A high frequency switching circuit including in combination a power transistor having a base-emitter circuit, a source of high frequency switching signals operatively coupled across the base-emitter of the power transistor for switching the base-emitter current of the transistor at high speeds, and means operatively connected across the base-emitter of the power transistor in parallel with the switching signal source for increasing the switching speed of the power transistor, further characterized by a blocking diode connected in series circuit relationship with a tunnel diode and adapted to conduct current in the same direction as the tunnel diode, an impedance matching diode connected in series with the emitter-base of the power transistor, the series circuit comprised by the tunnel diode and blocking diode being connected in parallel circuit relationship with the series circuit comprised by the impedance matching diode and the emitter-base of the power transistor, and a clamping diode operatively coupled in series circuit relationship with the emitter-base of the power transistor in a reverse polarity sense with respect to the blocking diode.

12. A new and improved high frequency power inverter circuit using high speed power transistors including in combination two sets of series-connected load current carrying high speed power transistors with each set being connected effectively in parallel circuit relationship across a pair of power supply terminals, a load connected between the juncture of each of the load current carrying power transistors in each set, a source of high frequency switching signals operatively coupled across the base-emitter of each of the high speed power transistors for switching the base-emitter current of each transistor at high speeds, and means comprising a tunnel diode operatively connected across the base-emitter of each power transistor in parallel with the switching signal source for increasing the switching speed of the power transistor.

References Cited

UNITED STATES PATENTS

| | | | |
|---|---|---|---|
| 3,102,206 | 8/1963 | Morgan ----------- | 307—88.5 |
| 3,153,151 | 10/1964 | Farnsworth -------- | 307—88.5 |

ARTHUR GAUSS, *Primary Examiner.*

J. BUSCH, *Assistant Examiner.*